Dec. 19, 1961  R. D. FERGUSON  3,013,856
SWAB PENETRATION RECORDER
Filed Nov. 6, 1959  2 Sheets-Sheet 1
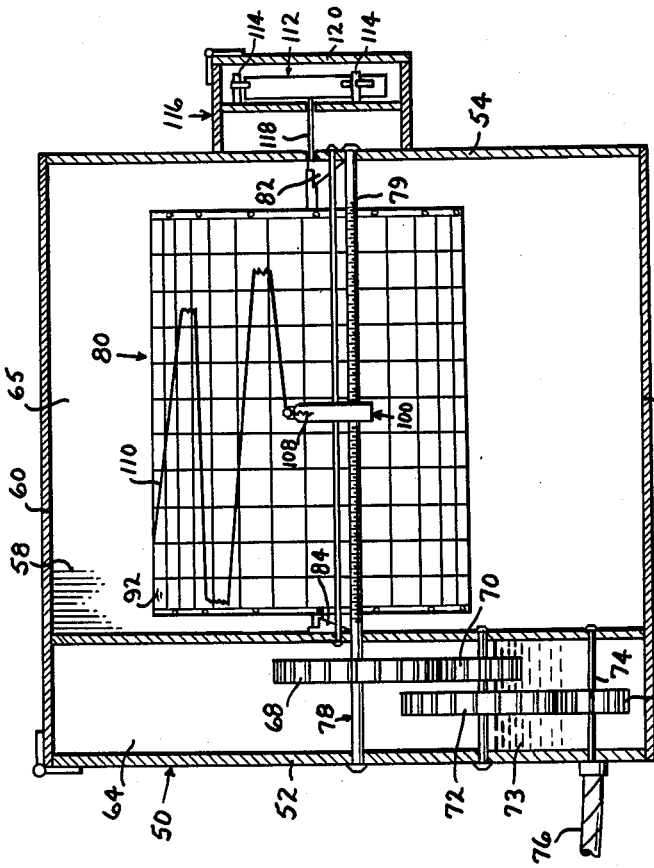
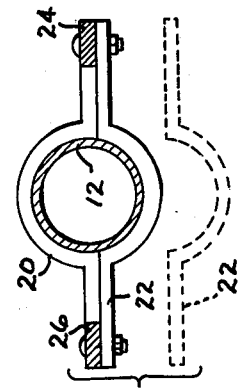
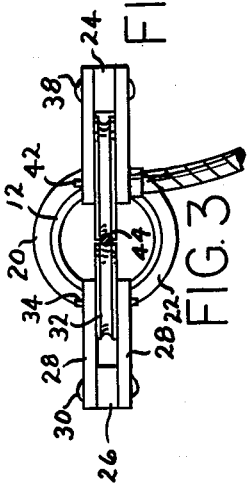
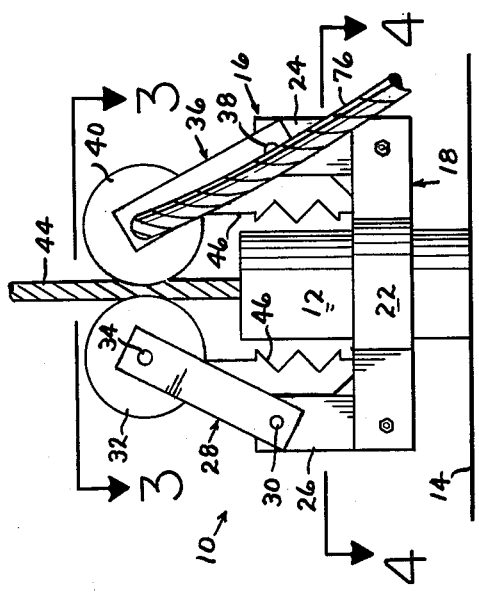
RICHARD D. FERGUSON
INVENTOR.
BY *Royal J. Miller*
ATTORNEY Dec. 19, 1961     R. D. FERGUSON     3,013,856
SWAB PENETRATION RECORDER Filed Nov. 6, 1959     2 Sheets-Sheet 2

RICHARD D. FERGUSON
INVENTOR.

BY *Loyd J. Miller*

ATTORNEY

United States Patent Office 3,013,856
Patented Dec. 19, 1961

3,013,856
SWAB PENETRATION RECORDER
Richard D. Ferguson, Guymon, Okla.
(2313 S. Indiana, Perryton, Tex.)
Filed Nov. 6, 1959, Ser. No. 851,461
2 Claims. (Cl. 346—33)

The present invention relates to the oil field industry and more particularly to a well logging machine.

In producing some completed oil wells it is necessary to run a swab into the cased bore hole by means of a wire line and to pull the swab which lifts the oil trapped in the casing thereabove. If the swab is not run into the well to a point equal to or below the producing zone, oil producing formations such as sand, or the like, tends to clog the channels or holes through which the oil is produced. Running and pulling the swab, therefore, reduces the pressure within the casing below the swab, creating a suction which tends to open up the channels through which oil flows into the casing or bore hole. It is, therefore, essential that the swab be run to a predetermined depth or to the producing zone within the drilled well to maintain the oil production of the individual well at a maximum level.

It is, therefore, the principal object of the instant invention to provide a device which will record the time the swab is lowered into a drilled well while simultaneously recording the depth to which the swab is lowered.

Another object is to provide a well logging device of this class which may be easily and removably connected to and operated by movement of the wire line supporting a swab, or the like.

Another object is to provide a device of this class which features a chart recording means positioned remote from the well head or casing and thus out of the way of normal swabing operations.

Still another object is to provide a device for recording the time and depth of penetration of an object lowered into a well bore on the end of a wire line wherein the recording chart may be easily and quickly replaced.

Yet another object is to provide a device of this class which needs servicing, such as replacing the chart or setting a timing means, only once in each 24 hour period.

A further object is to provide a device of this class which will insure that the well operating crew performs such swabing operations on time and to the depth required.

Yet another object is to provide a device which may be used in logging the drilling rate in drilling a well.

The present invention accomplishes these and other objects by providing a motion take-off means comprising a pair of pulleys contacting a vertical portion of a wire line and removably held in place by clamp means supported by the upper end portion of a well casing or the like. The motion take-off means includes a flexible shaft connected at one end with one of the pulleys and connected at its other end to a speed reduction transmission supported by a housing. The speed reduction transmission drives a threaded shaft journaled by the housing. A drum is journaled by the housing adjacent the threaded shaft. Scriber means carried by the threaded shaft includes a stylus contacting a chart carried by the periphery of the drum whereby the stylus is moved in opposing directions across the chart as the scriber means moves along the threaded shaft in response to the respective opposing directions of rotation of the threaded shaft. A clock or timing means supported by the housing is drivably connected to the drum for rotating the drum on its axis and advancing the chart thereon at a predetermined rate.

Other objects will be apparent from the following description when taken in conjunction with the accompanying two sheets of drawings, wherein:

FIGURE 1 is a side elevational view of the motion take-off means connected to a wire line;

FIGURE 2 is a vertical cross-sectional view, partly in elevation, of the logging machine;

FIGURE 3 is a top plan view of the motion take-off means taken substantially along line 3—3 of FIG. 1;

FIGURE 4 is a horizontal cross-sectional view taken substantially along line 4—4 of FIG. 1, and, illustrating, by dotted lines, the manner of connecting and disconnecting the same from a well casing;

Like characters of reference designate like parts in those figures of the drawings in which they occur.

In the drawings:

Figure 5:
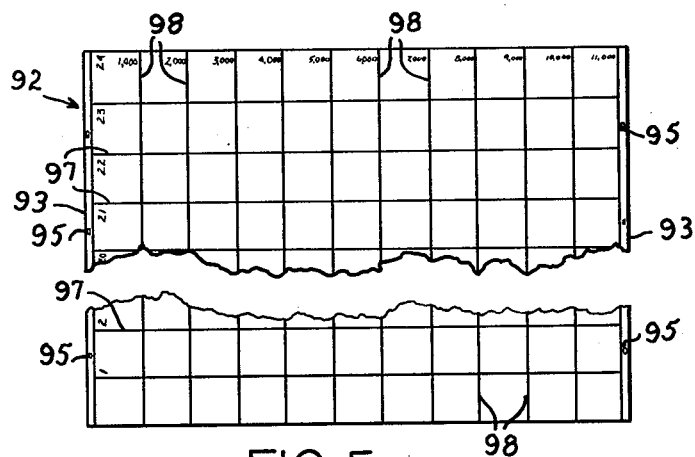
FIGURE 5 is a fragmentary plan view of the chart, per se.
Figures 6, 7:
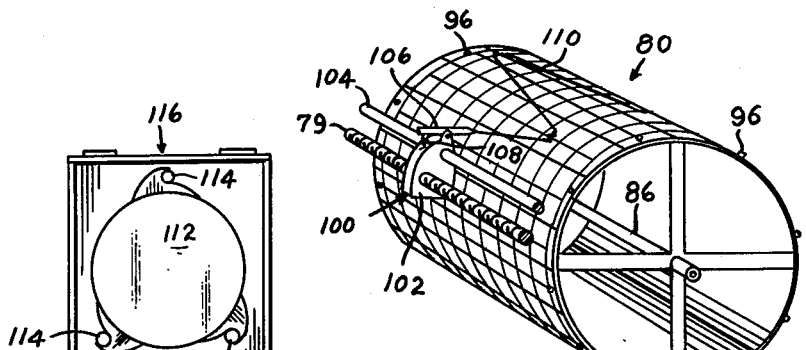
FIGURE 6 is a perspective view of the chart carrying drum and the manner of mounting the scribing means.
FIGURE 7 is an elevational view of the timing means installed within its housing.

The reference numeral 10 indicates, as a whole, an oil producing drilled well having a casing 12 projecting upwardly above the surface of the earth, or rig floor, indicated by the line 14. The casing 12 is shown by way of example only and represents any type of conventional well head with which the well may be equipped. The numeral 16 indicates a motion take-off means comprising a clamp member 18 formed in two sections, 20 and 22, which are adapted to encircle and grip the casing 12. Upright supports 24 and 26 are rigidly carried in aligned relation by the opposing ends of the clamp member 20. A pair of arms 28 are pivotally connected, at one end by a pin 30, to the opposing sides of the upper end portion of the support 26. The opposing free ends of the arms 28 journal a grooved pulley 32 therebetween on a horizontal axle 34. Similarly a second pair of arms 36 are pivotally connected at one end by a pin 38 to opposing sides of the upper end portion of the support 24. The upwardly disposed free ends of the arms 36 similarly journal a second pulley 40 on a horizontal axle 42. The peripheries of the pulleys 32 and 40 are cooperatingly aligned and grooved to engage opposing sides of a vertical portion of a wire line 44, as it is lowered into or pulled from the casing 12. The wire line 44 is connected to a conventional swab, not shown. As shown more clearly in FIG. 1, the spacing between the supports 24 and 26 and the length of the pairs of arms 28 and 36 is such that the pairs of arms are disposed in upwardly converging relation so that the wire line 44 is positioned substantially coaxial with respect to the bore of the casing 12. The pulleys are held in wire line contacting relation by a pair of springs 46, connected at one end to the clamp member 20, and connected at their respective opposing ends to the pairs of arms 28 and 36. This arrangement permits movement of the wire line to and fro within the bore of the casing along a line defined by a vertical plane taken through the pulleys.

A box-like housing indicated generally by the numeral 50 is positioned at any convenient point remote from the well location 10. The housing 50 is rectangular in general configuration having opposing sides 52 and 54, a bottom 56, and end closure sides 58, only one of which is visible in FIG. 2. A lid or top is hingedly connected to the housing side 52 which permits entry to the housing for the purposes which will presently be apparent. The housing is divided by a partition wall 62 to form a gear chamber 64 and a chart compartment 65.

A speed reducing transmission comprising a drive gear 66, a driven gear 68 and two intermediate or idler gears 70 and 72, are all journaled on horizontal axles supported by suitable bearings carried by the housing side 52 and partition wall 62. The gear 66 meshes with and drives the gear 72 while the gear 70, carried by an axle 69, common to the gears 70 and 72, meshes with and drives the gear 68. The speed reduction ratio of these gears may be varied as desired, and, in the example shown, provide a reduction of 4 to 1. The gear chamber 64 preferably contains a quantity of lubricant 73 for lubricating the gears. The axle 74, supporting the drive gear 66, extends outwardly of the housing wall 52 and is coaxially connected with one end of a flexible shaft 76 which extends between the housing 50 and the motion take-off means 16. The end of the flexible shaft 76, opposite the housing, is coaxially connected to the axle 42 of the pulley 40; thus vertical movement of the wire line 44 rotates the pulley 40, which in turn rotates the core, not shown, of the flexible shaft 76, thus operating the gears of the speed reducing transmission. The axle 78, supporting the gear 68, is extended through the partition 62 and is journaled by the housing wall 54. The axle 78 is preferably one-half inch in diameter and is externally threaded, thirteen threads per inch, substantially throughout that portion of its length extending through the drum or chart compartment 65 and forms a threaded shaft 79.

Figures 8, 9:
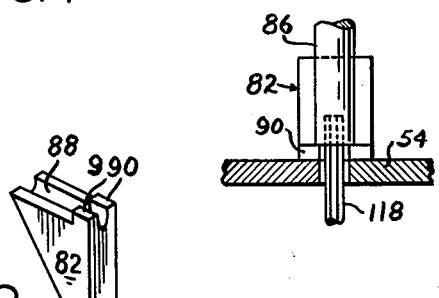
FIGURE 8 is a perspective view of one of the drum supporting bearings.
FIGURE 9 is a fragmentary top plan view, illustrating the manner of connecting the timing means to the drum, a fragment of the housing wall being shown in cross-section.

A cylindrical hollow drum 80 is journaled within the chart compartment 65, by bearings 82 and 84, connected with the housing side 54 and the partition wall 62 which removably receives the opposing end portions of the drum axle 86. As shown more clearly in FIG. 8, the bearings 82 and 84 each have an arcuate upwardly open bearing surface 88, which nests the respective end portions of the drum axle 86, thus permitting the drum to be lifted out of the housing after opening the lid 60 for the purposes which will presently be apparent. Each of the bearings 82 and 84 are further provided with an upstanding portion adjacent the respective wall of the housing which forms a spacer 90 and prevents longitudinal movement of the drum within the bearings. The periphery of the drum is disposed in spaced parallel relation with respect to the threaded shaft 79.

A chart indicated generally at 92 (FIG. 5) and which is rectangular in configuration is provided on each of its side portions 93 and 94 with a plurality of spaced-apart holes 95 which receive upstanding teeth or pins 96 formed on the periphery of the drum adjacent each end thereof whereby the pins 96 retain the chart on the drum. The chart is preferably scored, or marked by transverse and longitudinal lines 97 and 98, respectively. In the example shown, the transverse lines 97 are spaced approximately one inch apart and indicate one hour's time between each two adjacent lines. The circumference of the drum is such that a chart indicating 24 hours' time is received thereon. The longitudinal lines 98 are similarly equally spaced-apart and preferably on a scale which co-operates with the speed reducing transmission so that the spacing between each pair of lines 98 equals one thousand feet of penetration of an object lowered into the hole by the wire line 44. In the preferred embodiment shown the chart records a depth of 11,000 feet from the zero position, or left hand edge of the chart, as viewed in the drawings, to the right hand edge thereof.

Scriber means 100, comprising a support block 102, is threadedly engaged with the threaded shaft 79 which moves the scriber means transversely of the drum from left to right, as seen in FIG. 2, in response to the rotation of the shaft as the line 44 is lowered into the well.

A guide shaft or rod 104 extends slidably through the guide block 102 and between the housing wall 54 and partition wall 62 in relatively close spaced parallel relation with respect to the threaded shaft which prevents rotation of the guide block as the threaded shaft rotates. A stylus 106 is pivotally supported by the guide block 102 and has the tip or marking end thereof urged into line-forming contact with the surface of the chart by a spring 108. The stylus 106 may include a reservoir having a line-forming fluid which is transferred to the surface of the chart, or, preferably the stylus comprises a simple pointed instrument which, when contacting a chart having a sensitized surface, forms a line 110 on the chart as the scribing means 100 is moved.

Timing means 112 is removably supported by pins 114 within a relatively small box-like housing 116 secured to the outwardly disposed surface of the housing wall 54. The timing means 112 is more or less conventional and includes a splined or hexagonal drive shaft 118 which extends inwardly of the housing wall 54 through a suitable perforation, coaxial with respect to the axis of the drum 80, and is co-operatingly received within the adjacent end portion of the drum axle 86. Thus the timing means 112 progressively rotates the drum so that the stylus 106 indicates or forms the line 110, circumferently of the drum and indicates the passage of one hour's time between any two of the chart lines 97.

*Operation*

In operation, the motion take-off means 16 is connected to the casing and wire line as disclosed hereinabove. The swab or object, not shown, carried by the wire line, is lowered into the drilled well. Progressive downward movement of the wire line 44 rotates the pulley 40 which rotates the threaded shaft 79 by means of the flexible shaft 76 and the speed reducing transmission gears. This progressively moves the scriber means 100 from left to right, as seen in FIG. 2, and indicates the total depth to which the swab is run into the well by the line 110 formed on the surface of the chart 92. While this depth indication line is being formed, the timing means 112 progressively rotates the drum 80 and chart 92 thus indicating the amount of time required to lower the swab and records the time the swab is allowed to remain at the selected depth. Similarly, as the wire line 44 is progressively withdrawn from the well the threaded shaft is rotated in the opposing direction and moves the scriber means 100 from right to left, as viewed in FIG. 2, until the scriber means reaches the zero position at which time the swab has reached the upper end portion of the casing 12. The chart 92 is preferably replaced once each 24 hour period and this is accomplished by opening the door 122 of the timing means supporting housing 116 and manually removing the timing means 112; this permits the drum 80 and chart 92 to be manually lifted out of the bearings 82 and 84 through the open housing lid 60. The marked chart 92 is then manually removed from the pins 96 and a new unmarked chart is placed on the drum. The drum and timing means is thereafter reassembled by reversing the above procedure. Obviously the drum may be positioned so that the scriber means will start its time recording at any selected hour of the day and is set in co-operation with the time indicator of the timing means 112.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A device for recording the rate and depth of penetration of an object lowered by a wire line into a casing equipped drilled well, including: a motion take-off means progressively operated by vertical movement of the wire line, said motion take-off means including a clamp means secured horizontally to the upper end portion of said casing, upwardly converging spring actuated pairs of arms pivotally connected to said clamp means, a pulley wheel journaled by the free end portion of each said pair of arms, said pulley wheels each having a grooved periphery co-operatingly gripping opposing sides of the wire line for rotating the pulley wheels by movement of the wire line, and a flexible shaft having one end axially connected to one said pulley wheel for rotation therewith; a housing positioned remote from said well casing; a speed reducing transmission journaled within said housing, the end of said flexible shaft opposite said pulley wheel being connected with said speed reducing transmission; a threaded shaft connected with said transmission and horizontally journaled within said housing; a cylindrical drum journaled within said housing on a horizontal axle, said drum having its periphery disposed in parallel spaced relation with respect to said threaded shaft; a chart removably secured to the periphery of said drum; scribing means carried by said threaded shaft, said scribing means being movable in opposing directions along said threaded shaft in response to opposing directions of rotation of the latter, said scribing means including a stylus contacting said chart; and timing means supported by said housing and drivably connected with the axle of said drum for rotating the latter and advancing said chart at a predetermined rate.

2. A device for recording the rate and depth of penetration of an object lowered by a wire line into a casing equipped drilled well, including: a motion take-off means progressively operated by vertical movement of the wire line, said motion take-off means including, a clamp member horizontally secured to the upper end portion of said casing, pairs of upwardly converging arms pivotally connected at one end in aligned relation to opposing ends of said clamp member, a pulley wheel journaled by the free end portions of each said pair of arms, said pulley wheels having co-operating grooved peripheries for frictionally gripping opposing sides of said wire line and rotating said pulley wheels by movement of the wire line, spring means connected with said clamp member and each said pair of arms for maintaining the grooves of said pulley wheels in constant frictional contact with the wire line, and a flexible shaft having one end axially connected to one said pulley wheel for rotating the flexible shaft in response to movement of the wire line; a housing positioned remote from said well casing; a speed reducing transmission journaled within said housing, the end of said flexible shaft opposite the one said pulley wheel being drivably connected with said speed reducing transmission; a threaded shaft horizontally journaled by opposing walls of said housing and drivably connected with said speed reducing transmission; a cylindrical drum journaled by opposing walls of said housing on a horizontal axle in spaced parallel relation with respect to said threaded shaft; a chart removably secured to the periphery of said drum; scribing means carried by said threaded shaft for movement to and fro between the ends of said drum in response to downward and upward movement of the wire line, said scribing means including a stylus contacting the surface of said chart; and a timing means supported by one wall of said housing and drivably connected with the axle of said drum for rotating the latter and advancing the chart at a predetermined rate.

References Cited in the file of this patent

UNITED STATES PATENTS

| | | |
|---|---|---|
| 960,032 | Morris | May 31, 1910 |
| 2,287,819 | Nichols | June 30, 1942 |
| 2,733,599 | Storm | Feb. 7, 1956 |
| 2,806,372 | Arps | Sept. 17, 1957 |